(12) United States Patent
Wittenberg et al.

(10) Patent No.: US 10,929,623 B2
(45) Date of Patent: Feb. 23, 2021

(54) IMAGING MODULE AND READER FOR, AND METHOD OF, READING TARGETS BY IMAGE CAPTURE OVER A RANGE OF WORKING DISTANCES WITH MULTI-FUNCTIONAL AIMING LIGHT PATTERN

(71) Applicant: SYMBOL TECHNOLOGIES, LLC, Lincolnshire, IL (US)

(72) Inventors: Carl D. Wittenberg, Water Mill, NY (US); Chinh Tan, Setauket, NY (US); Ronald A. Petrozzo, Kings Park, NY (US); Paul F. Denimarck, Jr., Webster, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 531 days.

(21) Appl. No.: 15/090,648

(22) Filed: Apr. 5, 2016

(65) Prior Publication Data
US 2017/0289451 A1    Oct. 5, 2017

(51) Int. Cl.
*G06K 7/10* (2006.01)
*G01B 11/14* (2006.01)
*H04N 5/225* (2006.01)

(52) U.S. Cl.
CPC .......... *G06K 7/10722* (2013.01); *G01B 11/14* (2013.01); *G06K 7/10801* (2013.01); *H04N 5/2252* (2013.01); *H04N 5/2256* (2013.01); *H04N 5/2258* (2013.01); *G06K 2207/1011* (2013.01)

(58) Field of Classification Search
CPC ................... G06K 7/10722; G06K 7/10801
See application file for complete search history.

(56) References Cited

U.S. PATENT DOCUMENTS

| | | | |
|---|---|---|---|
| 7,182,260 B2 | 2/2007 | Gurevich et al. |
| 7,347,371 B2 | 3/2008 | Joseph et al. |
| 7,686,223 B2 | 3/2010 | Vinogradov et al. |
| 7,909,257 B2 | 3/2011 | Wang et al. |
| 8,061,616 B2 | 11/2011 | Goren et al. |
| 8,313,031 B2 | 11/2012 | Vinogradov |
| 8,622,303 B2 | 1/2014 | Meier et al. |
| 8,864,036 B2 | 10/2014 | Patil |

(Continued)

OTHER PUBLICATIONS

Handshaw et al., U.S. Appl. No. 15/140,644, filed Apr. 28, 2016.
(Continued)

*Primary Examiner* — Brian T Pendelton
*Assistant Examiner* — Kyle M Lotfi
(74) *Attorney, Agent, or Firm* — Yuri Astvatsaturov

(57) ABSTRACT

Near and far imagers image close-in and far-out targets over relatively wider and relatively narrower imaging fields of view, respectively. An aiming assembly directs to a target a visible aiming light pattern having an aiming light spot and a pair of collinear aiming light lines. The aiming light spot is substantially centered between the aiming light lines. A controller determines a distance to the target based on a position of the aiming light spot in the imaging field of view of a default one of the imagers, selects at least one of the imagers based on the determined distance, and enables both the close-in and the far-out targets to be positioned substantially entirely within the respective imaging field of view of the selected imager.

17 Claims, 7 Drawing Sheets

(56) References Cited

U.S. PATENT DOCUMENTS

| | | |
|---|---|---|
| 8,978,982 B2 | 3/2015 | Vinogradov et al. |
| 9,076,054 B2 | 7/2015 | Hennick et al. |
| 9,202,094 B1 | 12/2015 | Chen et al. |
| 2003/0034394 A1 | 2/2003 | Gannon et al. |
| 2006/0032919 A1* | 2/2006 | Shearin .............. G06K 7/10683 235/454 |
| 2007/0108284 A1 | 5/2007 | Pankow et al. |
| 2008/0290171 A1 | 11/2008 | Vinogradov |
| 2009/0272808 A1 | 11/2009 | Drzymala et al. |
| 2010/0155481 A1 | 6/2010 | Vinogradov et al. |
| 2012/0153022 A1 | 6/2012 | Havens et al. |
| 2014/0117092 A1 | 5/2014 | Vinogradov et al. |
| 2015/0097035 A1 | 4/2015 | Duan et al. |

OTHER PUBLICATIONS

International Search Report and Written Opinion for International Patent Application No. PCT/US2017/025920 dated Apr. Jul. 14, 2017.

* cited by examiner

IMAGING MODULE AND READER FOR, AND METHOD OF, READING TARGETS BY IMAGE CAPTURE OVER A RANGE OF WORKING DISTANCES WITH MULTI-FUNCTIONAL AIMING LIGHT PATTERN

BACKGROUND OF THE INVENTION

The present invention relates generally to an imaging module and an imaging reader for, and a method of, reading targets by image capture over a range of working distances with a multi-functional aiming light pattern for use not only in determining a distance of a target from the module/reader, but also in positioning both close-in and far-out targets substantially entirely within individual imaging fields of view of near and far imagers supported by the module/reader.

Solid-state imaging systems or imaging readers have been used, in both handheld and/or hands-free modes of operation, to electro-optically read targets, such as one- and two-dimensional bar code symbol targets, and/or non-symbol targets, such as documents. A handheld imaging reader includes a housing having a handle held by an operator, and an imaging module, also known as a scan engine, supported by the housing and aimed by the operator at a target during reading. The imaging module includes an imaging assembly having a solid-state imager or imaging sensor with an imaging array of photocells or light sensors, which correspond to image elements or pixels in an imaging field of view of the imager, and an imaging lens assembly for capturing return light scattered and/or reflected from the target being imaged, and for projecting the return light onto the array to initiate capture of an image of the target. Such an imager may include a one- or two-dimensional charge coupled device (CCD) or a complementary metal oxide semiconductor (CMOS) device and associated circuits for producing and processing electronic signals corresponding to a one- or two-dimensional array of pixel data over the imaging field of view. In order to increase the amount of the return light captured by the array, for example, in dimly lit environments, the imaging module generally also includes an illuminating light assembly for illuminating the target with illumination light in an illumination pattern for reflection and scattering from the target.

In some applications, for example, in warehouses, it is sometimes necessary for the same reader to read not only far-out targets, e.g., on products located on high overhead shelves, which are located at a far-out range of working distances on the order of thirty to fifty feet away from the reader, but also close-in targets, e.g., on products located at floor level or close to the operator, which are located at a close-in range of working distances on the order of less than two feet away from the reader. A near imager may be provided in the reader for imaging close-in targets over a relatively wider imaging field of view, and a far imager may also be provided in the same reader for imaging far-out targets over a relatively narrower imaging field of view. An aiming light assembly may also be provided in the reader for projecting a visible aiming light pattern on the targets. Although generally satisfactory for their intended purposes, it can be challenging for the reader to expeditiously select the correct imager to read a target that can be located anywhere in the working distance range. Furthermore, the same aiming light pattern configured to help locate a target within, for example, the larger field of view of the near imager may not be that helpful in locating a target within the smaller field of view of the far imager, and vice versa.

Accordingly, there is a need to configure the same aiming light pattern not only to expeditiously select the correct imager for a particular target without sacrificing reader performance, but also to reliably position both far-out targets and close-in targets within the respective imaging fields of view of the imagers in order to successfully read the targets by image capture.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
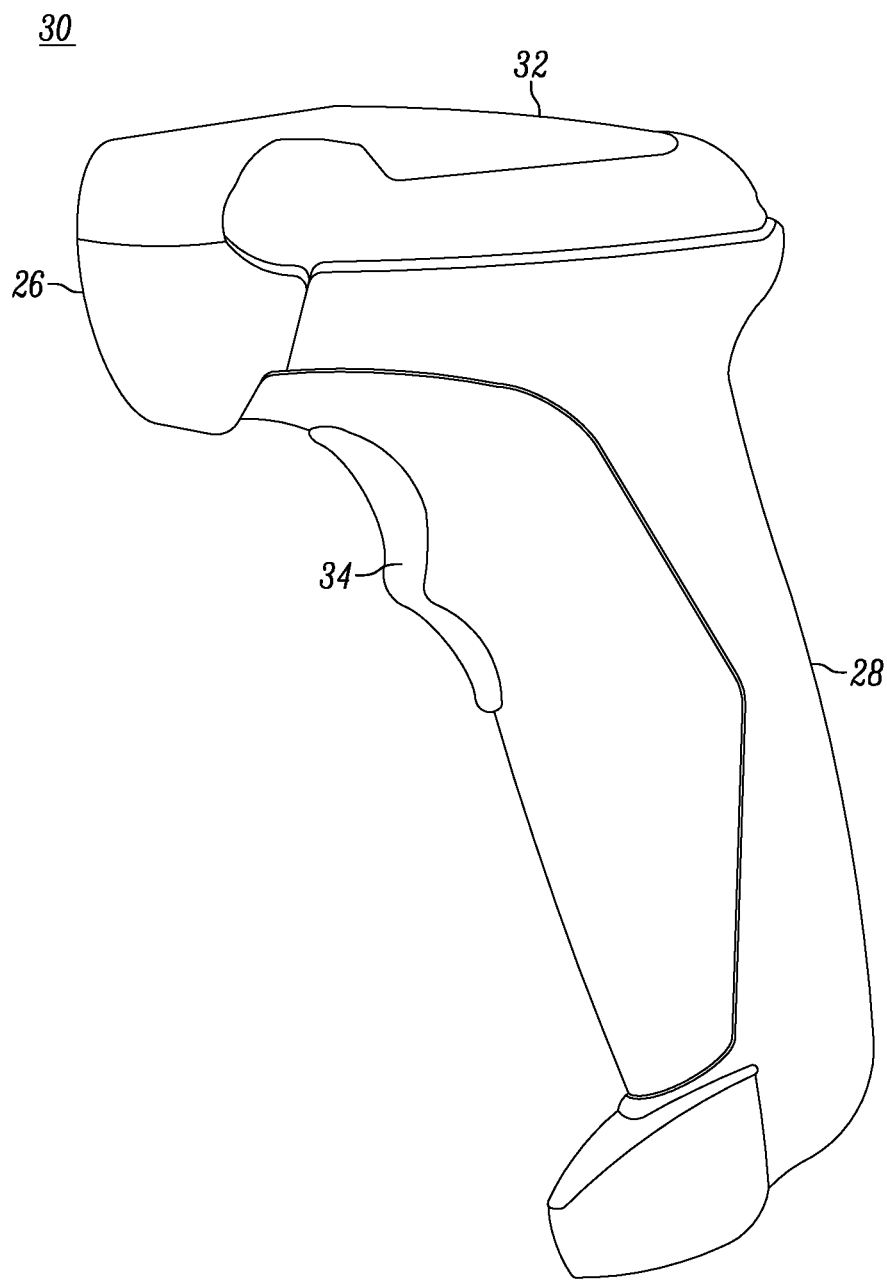
FIG. 1 is a side elevational view of a portable, handheld imaging reader operative for projecting a multi-functional aiming light pattern over an extended range of working distances in accordance with this disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of the present disclosure relates to an imaging module, also known as a scan engine, for reading targets by image capture over a range of working distances away from the module. Another aspect of the present disclosure relates to an imaging reader having a housing, especially a handheld housing, for supporting the imaging module, and a light-transmissive window on the housing. In both aspects, the imaging module comprises an imaging assembly including a near imager for imaging close-in targets along a near optical axis over a relatively wider imaging field of view, and a far imager for imaging far-out targets along a far optical axis over a relatively narrower imaging field of view. An aiming assembly directs along an aiming axis to a target a visible aiming light pattern having an aiming light spot and a pair of collinear aiming light lines. The aiming light spot lies on the aiming axis and is substantially centered between the aiming light lines. A programmed microprocessor or controller determines a distance to the target based on a position of the aiming light spot in the imaging field of view of a default one of the imagers, selects at least one of the imagers based on the determined distance, and enables both the close-in and the far-out targets to be positioned substantially entirely within the respective imaging field of view of the selected one of the imagers.

Preferably, the default imager is the far imager. The aiming assembly emits an aiming beam to form the aiming light spot along the aiming axis that is offset from the far optical axis. The aiming assembly directs the aiming light spot both on close-in and far-out targets. To position a close-in target, the aiming light lines have outer ends that lie within, and define outer boundaries of, the relatively wider imaging field of view. For a far-out target, the aiming light lines lie outside the relatively narrower imaging field of view, and have inner ends that are spaced apart away from the far-out target. The aiming light spot is isolated from the aiming light pattern, and preferably only the isolated aiming light spot is incident on the far-out target and appears in the relatively narrower imaging field of view. The isolated aiming light spot is particularly advantageous for determining the target distance expeditiously, simply, and relatively inexpensively.

Still another aspect of the present disclosure relates to a method of reading targets by image capture over a range of working distances away from the module. The method is performed by providing a near imager for imaging close-in targets along a near optical axis over a relatively wider imaging field of view, by providing a far imager for imaging far-out targets along a far optical axis over a relatively narrower imaging field of view, by directing along an aiming axis to a target a visible aiming light pattern having an aiming light spot and a pair of collinear aiming light lines, by positioning the aiming light spot to lie on the aiming axis and to be substantially centered between the aiming light lines, by determining a distance to the target based on a position of the aiming light spot in the imaging field of view of a default one of the imagers, by selecting at least one of the imagers based on the determined distance, and by enabling both the close-in and the far-out targets to be positioned substantially entirely within the respective imaging field of view of the selected one of the imagers.

Hence, far-out targets and close-in targets can all be read by the same reader and by the same aiming pattern. The same aiming light pattern is configured not only to expeditiously select the correct imager for a particular target without sacrificing reader performance, but also to reliably position both far-out targets and close-in targets within the respective imaging fields of view of the imagers in order to successfully read the targets.

Reference numeral 30 in FIG. 1 generally identifies an ergonomic imaging reader configured as a gun-shaped housing having an upper barrel or body 32 and a lower handle 28 tilted rearwardly away from the body 32 at an angle of inclination, for example, fifteen degrees, relative to the vertical. A light-transmissive window 26 is located adjacent the front or nose of the body 32 and is preferably also tilted at an angle of inclination, for example, fifteen degrees, relative to the vertical. The imaging reader 30 is held in an operator's hand and used in a handheld mode in which a trigger 34 is manually depressed to initiate imaging of targets, especially bar code symbols, to be read in an extended range of working distances, for example, on the order of thirty to fifty feet, away from the window 26. Housings of other configurations, as well as readers operated in the hands-free mode, could also be employed.

Figure 2:
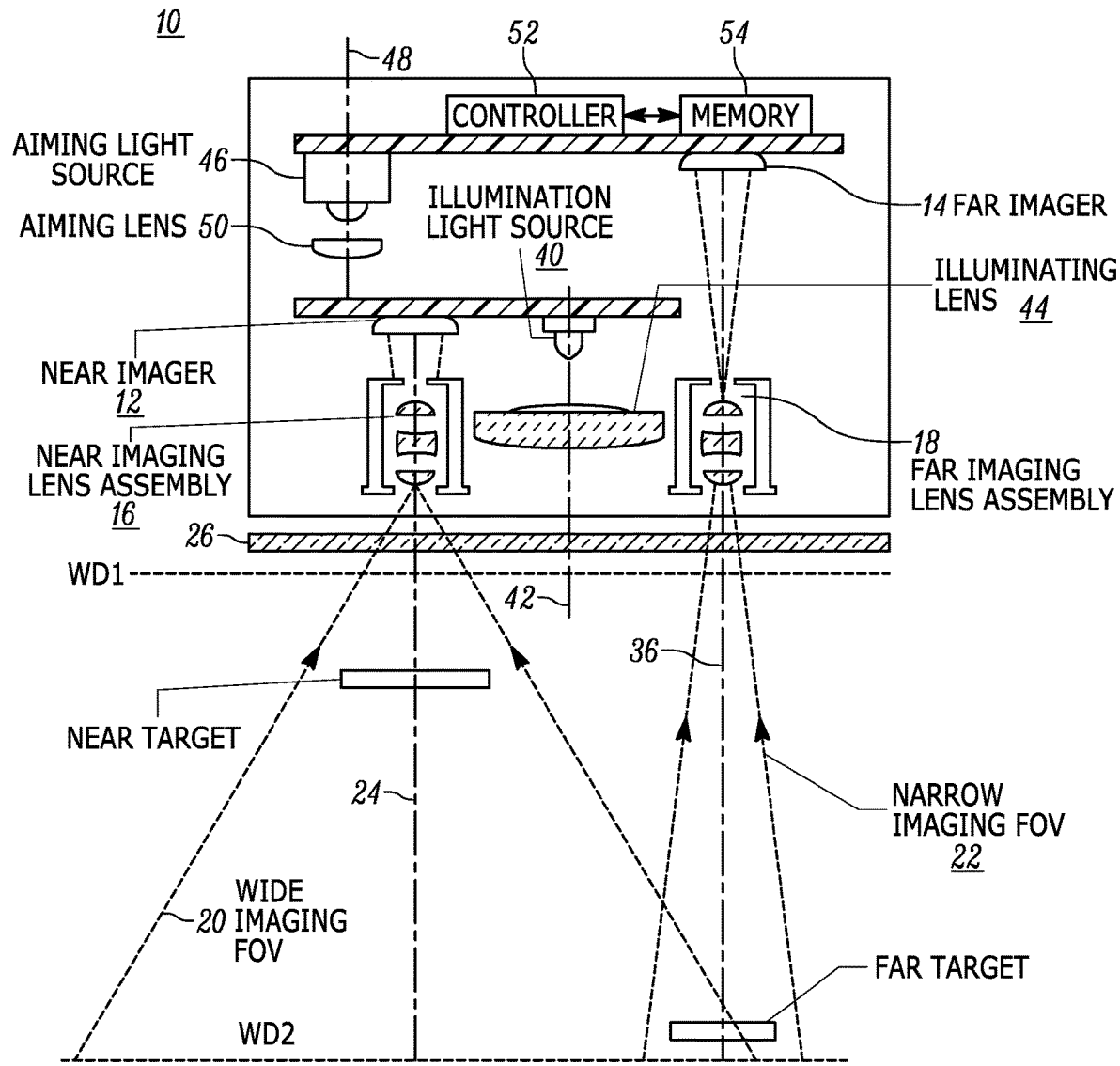
FIG. 2 is a schematic diagram of various components, including imaging, illuminating, and aiming light assemblies supported on an imaging module that is mounted inside the reader of FIG. 1.
Figure 3:
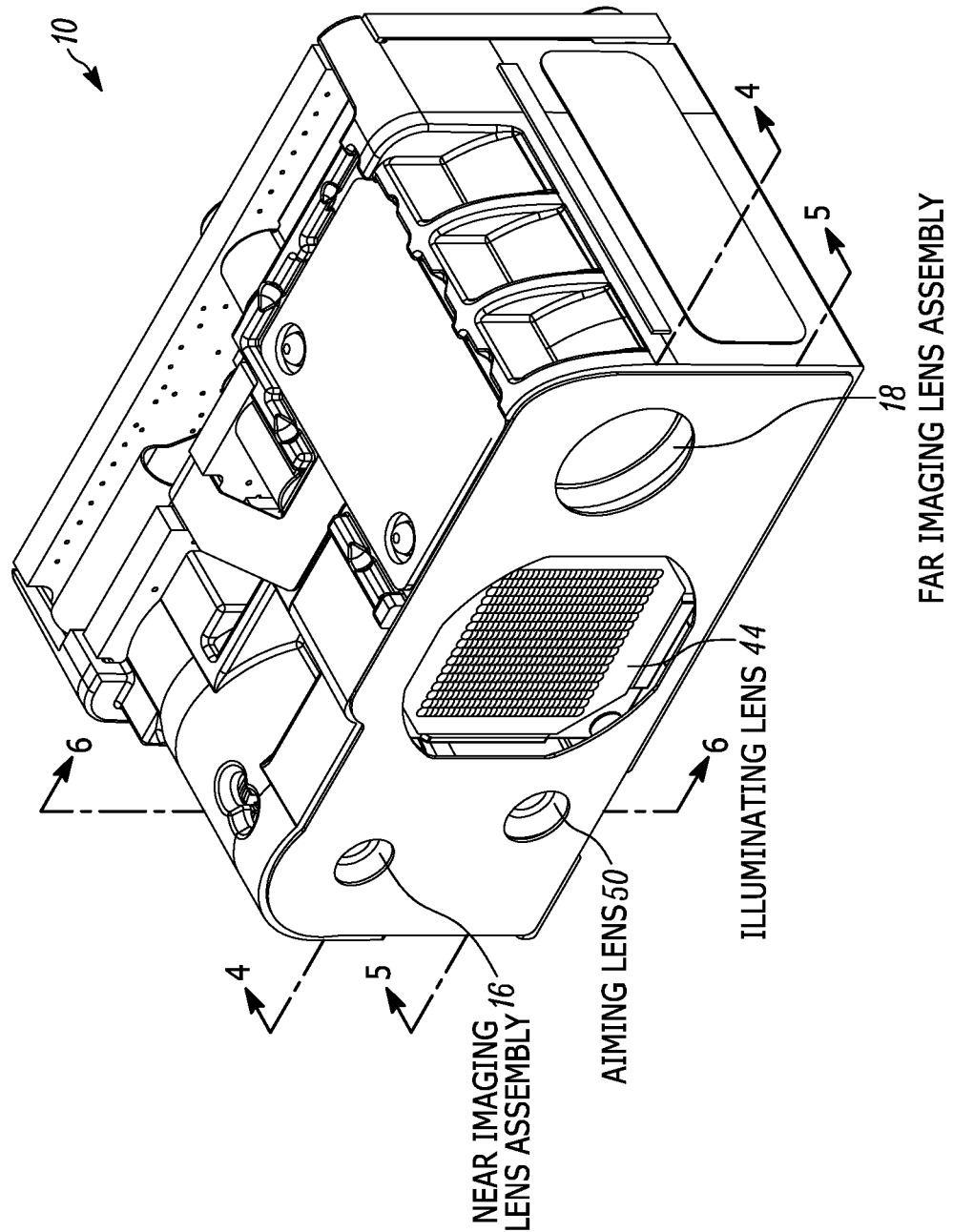
FIG. 3 is a perspective view of the imaging module of FIG. 2 in isolation.

As schematically shown in FIG. 2, and as more realistically shown in FIGS. 3-6, an imaging module 10 is mounted in the reader 30 behind the window 26 and is operative, as described below, for reading targets by image capture through the window 26 over an extended range of working distances away from the module 10. A target may be located anywhere in a working range of distances between a close-in working distance (WD1) and a far-out working distance (WD2). In a preferred embodiment, WD1 is either at, or about eighteen inches away, from the window 26, and WD2 is much further away, for example, over about sixty inches away from the window 26. An intermediate working distance between WD1 and WD2 is about eighteen to about sixty inches away from the window 26. The module 10 includes an imaging assembly that has a near imaging sensor or imager 12, and a near imaging lens assembly 16 for capturing return light over a generally rectangular, relatively wide imaging field of view 20, e.g., about thirty degrees, from a near target located in a close-in region of the range, e.g., from about zero inches to about eighteen inches away from the window 26, and for projecting the captured return light onto the near imager 12, as well as a far imaging sensor or imager 14, and a far imaging lens assembly 18 for capturing return light over a generally rectangular, relatively narrow imaging field of view 22, e.g., about sixteen degrees, from a far target located in a far-out region of the range, e.g., greater than about sixty inches away from the window 26, and for projecting the captured return light onto the far imager 14. Although only two imagers 12, 14 and two imaging lens assemblies 16, 18 have been illustrated in FIG. 2, it will be understood that more than two could be provided in the module 10.

Each imager 12, 14 is a solid-state device, for example, a CCD or a CMOS imager having a one-dimensional array of addressable image sensors or pixels arranged in a single, linear row, or preferably a two-dimensional array of such sensors arranged in mutually orthogonal rows and columns, and operative for detecting return light captured by the respective imaging lens assemblies 16, 18 along respective near and far imaging axes 24, 36 through the window 26. Each imaging lens assembly is advantageously a Cooke triplet, although other fixed focus and variable focus lens combinations can also be employed.

Figure 4:
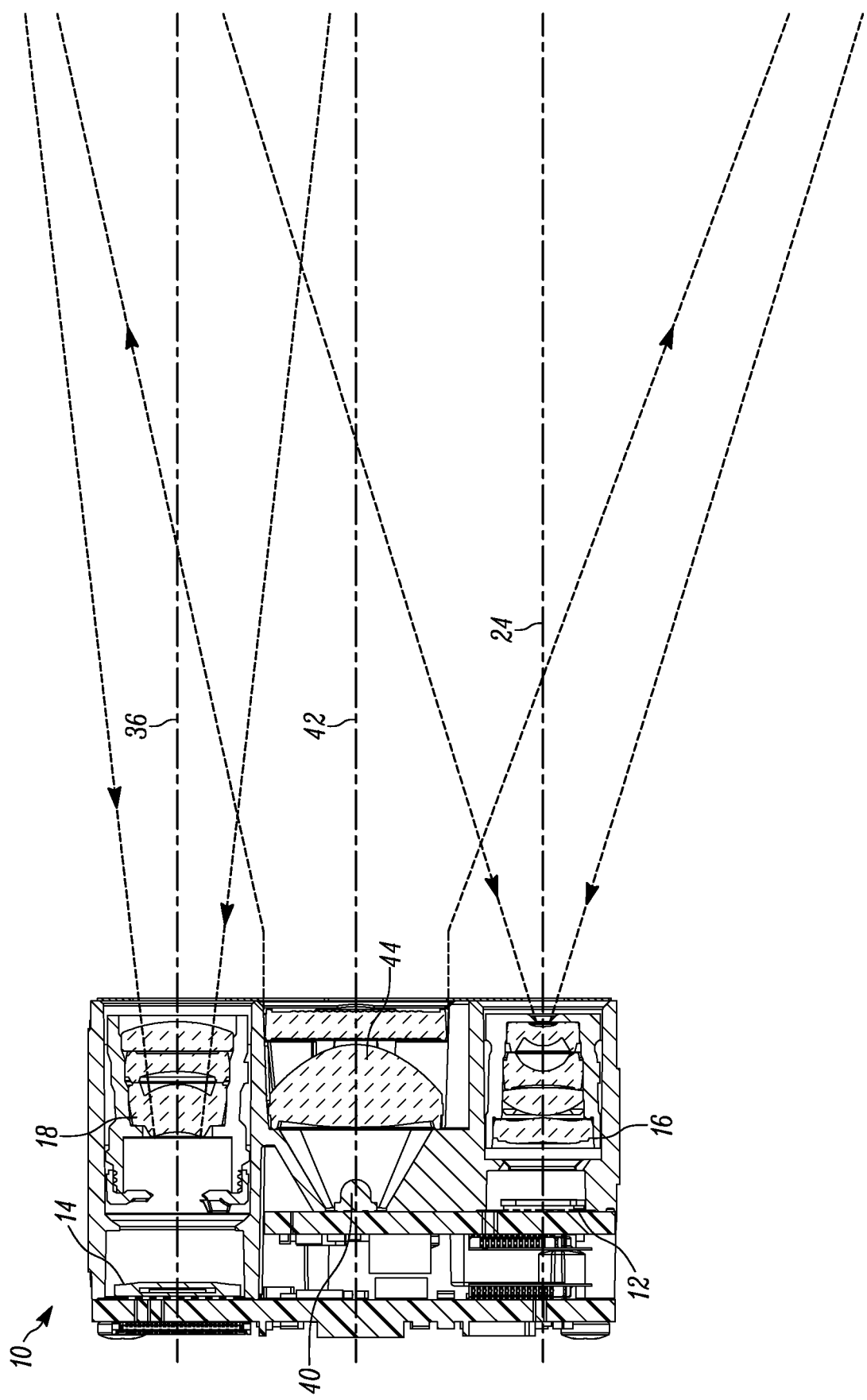
FIG. 4 is a cross-sectional view taken on line 4-4 of FIG. 3.

As also shown in FIGS. 2 and 4, an illuminating light assembly is also supported by the imaging module 10 and includes an illumination light source, e.g., at least one light emitting diode (LED) 40, stationarily mounted on an optical axis 42, and an illuminating lens assembly that includes an illuminating lens 44 also centered on the optical axis 42. The illuminating light assembly is shared by both imagers 12, 14.

Figure 5:
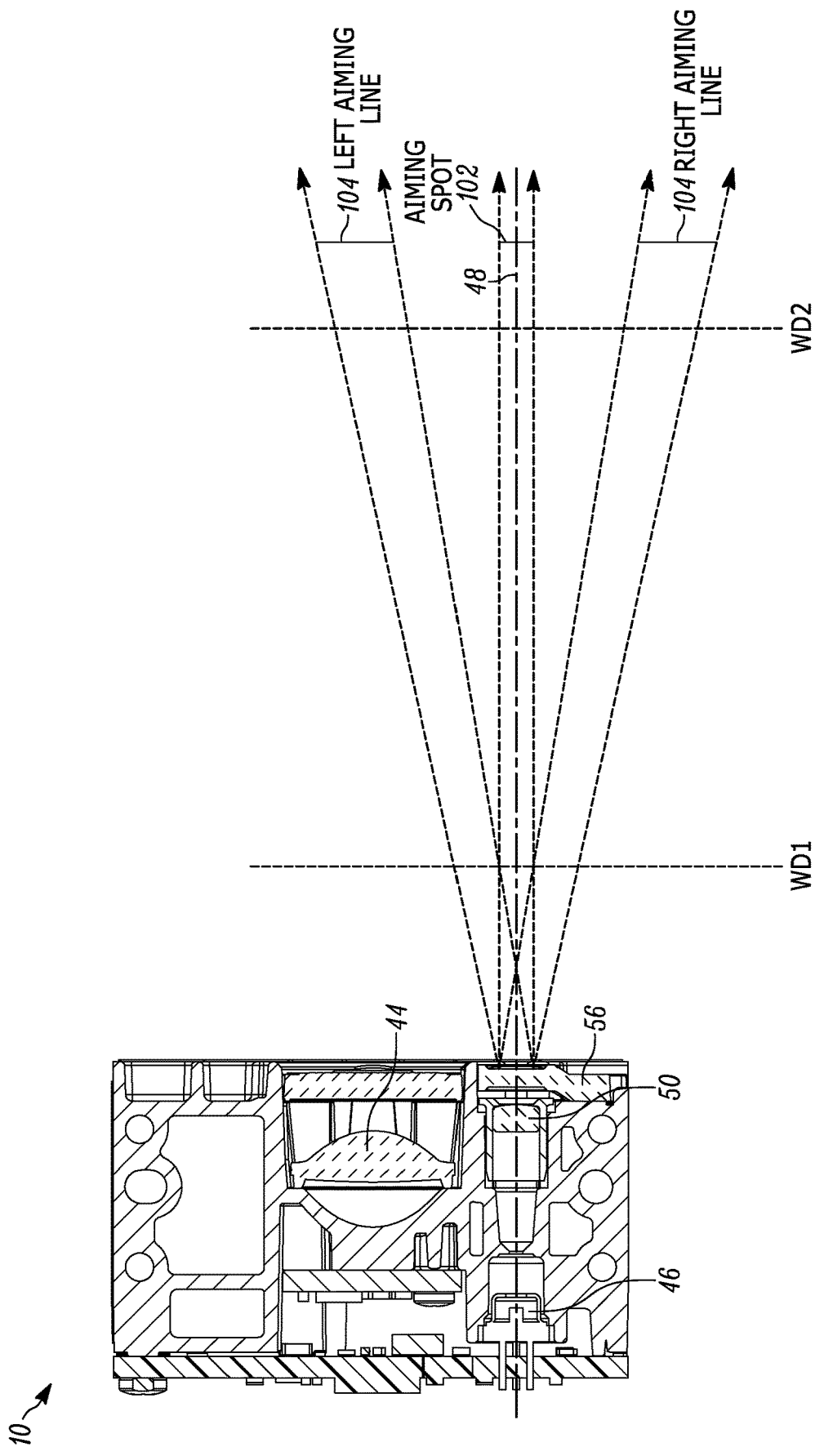
FIG. 5 is a cross-sectional view taken on line 5-5 of FIG. 3.
Figure 6:
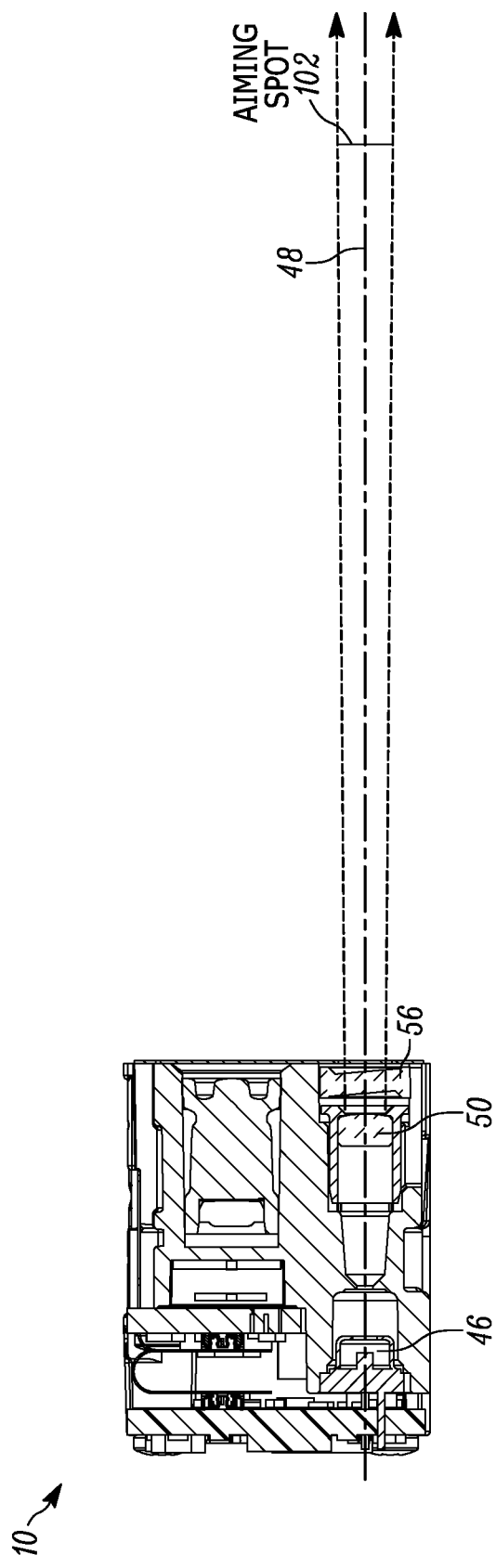
FIG. 6 is a vertical sectional view taken on line 6-6 of FIG. 3.

As further shown in FIGS. 2, 5 and 6, an aiming light assembly is also supported by the imaging module 10 and includes an aiming light source 46, e.g., a laser, stationarily mounted on an aiming axis 48, and a set of aiming lenses 50, 56 centered on the aiming axis 48. The aiming lens 56 may be a diffractive or a refractive optical element, and is operative for projecting a visible aiming light pattern along the aiming axis 48 on the target prior to reading. The aiming light pattern comprises, as best seen in FIGS. 5-8, an aiming light spot 102, preferably circular, and a pair of collinear right and left aiming light lines 104. The aiming light spot 102 lies on the aiming axis 48 and is substantially centered between the aiming light lines 104. As described below in connection with FIGS. 7 and 8, the aiming light pattern enables both the close-in and the far-out targets to be positioned substantially entirely within the respective, generally rectangular, imaging fields of view of the imagers. By way of non-limiting numerical example, in a preferred embodiment, at a target distance of about 150 mm away from the reader 30, the inner ends of the aiming light lines 104 are spaced about 38 mm apart, the outer ends of the aiming light lines 104 are spaced about 69 mm apart, and the diameter of the aiming light spot 102 is on the order of 2.5 mm. The aiming light pattern thus resembles a "dash-dot-dash" pattern.

As further shown in FIG. 2, the imagers 12, 14, the LED 40 and the laser 46 are operatively connected to a controller or programmed microprocessor 52 operative for controlling the operation of these components. A memory 54 is connected and accessible to the controller 52. Preferably, the controller 52 is the same as the one used for processing the return light from the targets and for decoding the captured target images.

The aiming light spot 102 is also used as a range finder to determine the distance to the target. The aiming axis 48 is offset from the near and far imaging axes 24, 36 so that the resulting parallax between the aiming spot 102 on the aiming axis 48 and one of the near and far imaging axes 24, 36 provides target distance information. More particularly, the parallax between the aiming axis 48 and either one of the near and far imaging axes 24, 36 provides range information from the pixel position of the aiming beam on one of the imaging sensor arrays. It is preferred to use the imaging axis 36 of the far imager 14 by default, because the parallax error will be greater for the far imager 14 than for the near imager 12. Thus, the range finder locates the target to determine whether the target is in a close-in region, or an intermediate region, or a far-out region, of the range.

In operation, once the target is located, the controller 52 either selects the near imager 12, and energizes the illuminating light assembly to illuminate the target with illumination light of a relatively lesser intensity when the range finder determines that the target to be imaged and read by the near imager 12 is located in a close-in region of the range; or selects the far imager 14, and energizes the illuminating light assembly to illuminate the target with illumination light of a relatively greater intensity when the range finder determines that the target to be imaged and read by the far imager 14 is located in a far-out region of the range; or alternately selects between the near imager 12 and the far imager 14, and energizes the illuminating light assembly to illuminate the target with illumination light of a relatively intermediate intensity that is between the lesser intensity and the greater intensity when the range finder determines that the target to be imaged and read by the alternately selected imager is located in an intermediate region that is between the close-in region and the far-out region of the range.

The controller 52 can also adjust the focusing of the default far imager 14 and its lens assembly 18 based on the determined target distance. The controller 52 energizes the LED 40 with a variable electrical current to vary the intensity of the illumination light. By way of non-limiting numerical example, the electrical current is on the order of 30 milliamperes when the close-in region lies between about 0.0 inches and about eighteen inches from the window 26, is on the order of 150 milliamperes when the intermediate region lies between about eighteen inches and about sixty inches from the window 26, and is on the order of 600 milliamperes when the far-out region lies between about sixty inches and infinity from the window 26. The controller 52 varies the intensity of the illumination light either as a continuous analog function, or as a stepwise, multi-level function, of the distance determined by the range finder.

Figure 7:
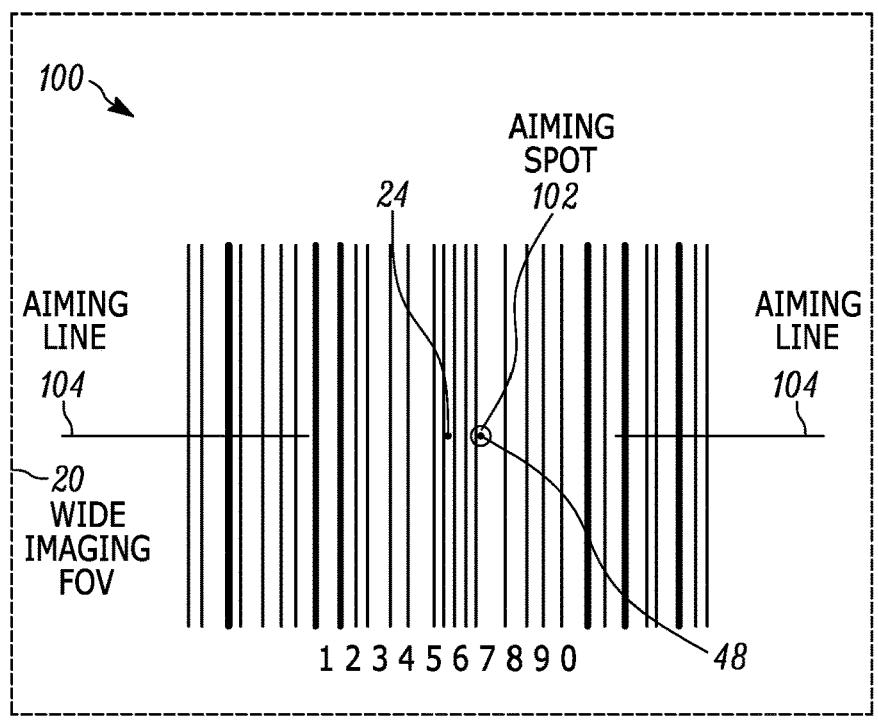
FIG. 7 is an enlarged view of an aiming light pattern on a close-in target located near to the reader of FIG. 1.

As shown in FIG. 7, the aiming light pattern is projected over an angular spread onto a close-in target 100, which is being imaged by the near imager 12 over the generally rectangular, wide imaging field of view 20. The outer ends of the aiming light lines 104 visually indicate the outer extent or boundaries of the wide imaging field of view 20, and thus define the maximum width of the close-in target 100 that can fit within the wide imaging field of view 20. The aiming light spot 102 visually indicates the approximate center of the wide imaging field of view 20. The aiming light lines 104 and the aiming light spot 102 together assist an operator in visually positioning the target substantially entirely within the wide imaging field of view 20.

Figure 8:
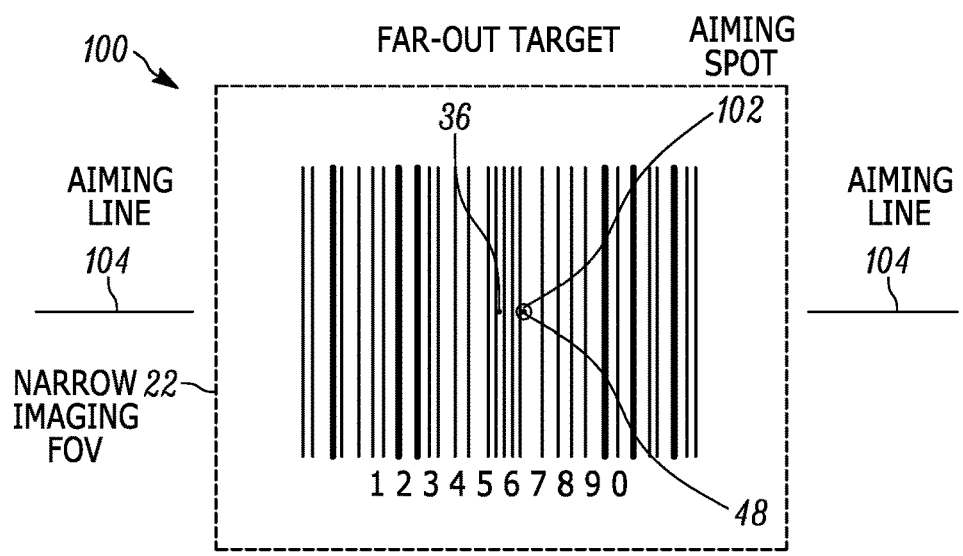
FIG. 8 is an enlarged view of the same aiming light pattern of FIG. 7 on a far-out target located far from the reader of FIG. 1.

As shown in FIG. 8, the aiming light pattern is projected over an angular spread onto a far-out target 100, which is being imaged by the far imager 14 over the generally rectangular, narrow imaging field of view 22. However, only the aiming light spot 102 is incident and appears on the far-out target 100. The aiming light lines 104 lie outside the narrow imaging field of view 22. The aiming light lines 104 have inner ends that are spaced apart away from the far-out target 100. Thus, the aiming light spot 102 is effectively isolated from the aiming light pattern, and only the aiming light spot 102 is used to assist the operator in visually positioning the far-out target 100 substantially entirely within the narrow imaging field of view 22.

As described above, the target distance is determined from the position of the aiming light spot 102 on the target relative to the imaging axis 36 of the default far imager 14. By configuring the module/reader so that only the isolated aiming light spot 102 appears on the target, the determination of the distance can be effected expeditiously, simply, and relatively inexpensively.

Advantageously, the aiming assembly generates the aiming light spot 102 with a spot light intensity, and generates the aiming light lines 104 with a line light intensity that is less than the spot light intensity. Hence, for far-out targets, the aiming light spot 102 is the most visible feature.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having,"

"includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An imaging module for reading targets by image capture over a range of working distances away from the module, the module comprising:
   an imaging assembly including a near imager for imaging close-in targets along a near optical axis over a relatively wider imaging field of view, and a far imager for imaging far-out targets along a far optical axis over a relatively narrower imaging field of view;
   an aiming assembly for directing along an aiming axis to a target a visible aiming light pattern having an aiming light spot and a pair of collinear aiming light lines, the aiming light spot lying on the aiming axis and being substantially centered between the aiming light lines; and
   a controller for determining a distance to the target based on a parallax between the aiming light spot in the imaging field of view of a default one of the imagers and an optical axis of the default one of the imagers, and for selecting at least one of the imagers based on the determined distance,
   wherein the aiming assembly directs the aiming light spot on a far-out target, and wherein the aiming light lines lie outside the relatively narrower imaging field of view.

2. The module of claim 1, wherein the aiming assembly directs the aiming light spot on a close-in target, and wherein the aiming light lines have outer ends that lie within, and define outer boundaries of, the relatively wider imaging field of view.

3. The module of claim 1, wherein the aiming light spot is isolated from the aiming light pattern, and only the isolated aiming light spot is incident on the far-out target and appears in the relatively narrower imaging field of view.

4. The module of claim 1, wherein the aiming light lines have inner ends that are spaced apart away from the far-out target.

5. The module of claim 1, wherein the aiming assembly generates the aiming light spot with a spot light intensity, and generates the aiming light lines with a line light intensity that is less than the spot light intensity.

6. The module of claim 1, wherein the default imager is the far imager, and wherein the aiming assembly emits an aiming beam to form the aiming light spot along the aiming axis that is offset from the far optical axis.

7. An imaging reader for reading targets by image capture over a range of working distances away from the reader, the reader comprising:
   a handheld housing having a light-transmissive window; and
   an imaging module supported by the housing and including
      an imaging assembly including a near imager for imaging close-in targets through the window along a near optical axis over a relatively wider imaging field of view, and a far imager for imaging far-out targets through the window over a relatively narrower imaging field of view,
      an aiming assembly for directing through the window along an aiming axis to a target a visible aiming light pattern having an aiming light spot and a pair of collinear aiming light lines, the aiming light spot lying on the aiming axis and being substantially centered between the aiming light lines; and a controller for determining a distance to the target based on a parallax between the aiming light spot in the imaging field of view of a default one of the imagers and an optical axis of the default one of the imagers, and for selecting at least one of the imagers based on the determined distance, wherein the aiming assembly directs the aiming light spot on a far-out target, and wherein the aiming light lines lie outside the relatively narrower imaging field of view.

8. The reader of claim 7, wherein the aiming assembly directs the aiming light spot on a close-in target, and wherein the aiming light lines have outer ends that lie within, and define outer boundaries of, the relatively wider imaging field of view.

9. The reader of claim 7, wherein the aiming light spot is isolated from the aiming light pattern, and only the isolated aiming light spot is incident on the far-out target and appears in the relatively narrower imaging field of view.

10. The reader of claim 7, wherein the aiming light lines have inner ends that are spaced apart away from the far-out target.

11. The reader of claim 7, wherein the aiming assembly generates the aiming light spot with a spot light intensity, and generates the aiming light lines with a line light intensity that is less than the spot light intensity.

12. The reader of claim 7, wherein the default imager is the far imager, and wherein the aiming assembly emits an aiming beam to form the aiming light spot along the aiming axis that is offset from the far optical axis.

13. A method of reading targets by image capture over a range of working distances away from the module, the method comprising:

providing a near imager for imaging close-in targets along a near optical axis over a relatively wider imaging field of view;

providing a far imager for imaging far-out targets along a far optical axis over a relatively narrower imaging field of view;

directing along an aiming axis to a target a visible aiming light pattern having an aiming light spot and a pair of collinear aiming light lines;

positioning the aiming light spot to lie on the aiming axis and to be substantially centered between the aiming light lines;

determining a distance to the target based on a parallax between the aiming light spot in the imaging field of view of a default one of the imagers and an optical axis of the default one of the imagers;

selecting at least one of the imagers based on the determined distance; and and directing the aiming light spot on a far-out target, and configuring the aiming light lines to lie outside the relatively narrower imaging field of view.

14. The method of claim 13, and directing the aiming light spot on a close-in target, and configuring the aiming light lines to have outer ends that lie within, and define outer boundaries of, the relatively wider imaging field of view.

15. The method of claim 13, and isolating the aiming light spot from the aiming light pattern, and directing only the isolated aiming light spot to be incident on the far-out target and to appear in the relatively narrower imaging field of view.

16. The method of claim 13, and configuring the aiming light lines to have inner ends that are spaced apart away from the far-out target.

17. The method of claim 13, and generating the aiming light spot with a spot light intensity, and generating the aiming light lines with a line light intensity that is less than the spot light intensity.

* * * * *